United States Patent
Ahluwalia

[19]

[11] Patent Number: 5,967,930
[45] Date of Patent: Oct. 19, 1999

[54] ADAPTER FOR TRANSFER CASES

[75] Inventor: Parvinder Ahluwalia, Manlius, N.Y.

[73] Assignee: New Venture Gear, Inc., Troy, Mich.

[21] Appl. No.: 08/853,016

[22] Filed: May 8, 1997

[51] Int. Cl.[6] .............................. F16H 37/08; F16P 57/02; B60K 17/354
[52] U.S. Cl. ..................... 475/206; 475/202; 74/606 R; 74/665 GA; 74/15.66; 180/247
[58] Field of Search ..................................... 474/148, 149, 474/150; 475/205, 206, 198, 202, 210; 180/233, 247, 197, 250, 251; 74/665 GA, 606 R, 557, 15.8, 15.66

[56] References Cited

U.S. PATENT DOCUMENTS

| | | | |
|---|---|---|---|
| 4,280,583 | 7/1981 | Stieg | 180/250 |
| 4,714,128 | 12/1987 | Yoshinaka | 74/606 R X |
| 4,744,436 | 5/1988 | Uchiyama | 74/606 R |
| 4,878,399 | 11/1989 | Kameda | 180/250 X |
| 5,022,478 | 6/1991 | Hartmann | 74/15.66 X |
| 5,609,540 | 3/1997 | Brissenden | 475/206 |
| 5,704,863 | 1/1998 | Zalewski et al. | 475/206 X |
| 5,704,866 | 1/1998 | Pritchard et al. | 475/206 |

*Primary Examiner*—Tamara L. Graysay
*Assistant Examiner*—Marcus Charles
*Attorney, Agent, or Firm*—Harness, Dickey & Pierce, P.L.C.

[57] ABSTRACT

An adapter for installation between a single-offset transfer case and a transmission unit. The adapter includes an adapter input shaft coupled to an output shaft of the transmission, an adapter output shaft coupled to an input shaft of the transfer case, and a drive mechanism connecting the adapter input and output shafts. The adapter input shaft is rotatably driven by the transmission output shaft about a first rotary axis. The adapter output shaft is rotatably driven by the adapter input shaft about a second rotary axis. The input shaft and a first output shaft of the transfer case are commonly aligned for rotation with adapter output shaft for rotation about the second rotary axis. The transfer case has a second output shaft supported for rotation about a third rotary axis. Optionally, the adapter may include a torque disconnect clutch for disconnecting drive torque from the transmission to the transfer case for functions requiring torque interruption such as towing and for assisting in "on-the-fly" shifting between four-wheel high- and low-range drive modes.

10 Claims, 4 Drawing Sheets

ADAPTER FOR TRANSFER CASES

BACKGROUND OF THE INVENTION

The present invention relates to a power transfer system for a four-wheel drive motor vehicle and, in particular, to an adapter for converting a single offset transfer case into a one and one half offset transfer case assembly.

In view of the increased popularity of four-wheel drive vehicles, a plethora of power transfer systems are currently utilized for distributing tractive power (i.e., drive torque) to all four wheels of the motor vehicle. Conventionally, most four-wheel drive power transfer systems include a transfer case having an input shaft driven by the transmission output shaft, a rear output shaft driven by the input shaft and which is interconnected via a rear prop shaft to a rear axle assembly for driving the rear wheels, a front output shaft interconnected via a front prop shaft to a front axle assembly for driving the front wheels, and a torque transfer arrangement for continuously or selectively transferring drive torque from the rear output shaft to the front output shaft.

Currently, several different types of power transfer systems are being utilized in four-wheel drive vehicles. In "part-time" four-wheel drive systems, the transfer case is equipped with a mode shift mechanism which permits the vehicle operator to selectively couple the front output shaft to the rear output shaft for shifting the vehicle from a two-wheel drive mode into a four-wheel drive mode. An example of a part-time transfer case is shown and disclosed in commonly-owned U.S. Pat. No. 5,159,847 to Williams et al. Alternatively, "on-demand" power transfer systems are used to automatically transfer drive torque to the non-driven wheels when traction is lost at the driven wheels without any input or action required by the vehicle operator. For instance, a speed-sensitive torque transfer device can be installed in the transfer case for transferring drive torque from the rear output shaft to the front output shaft when an excessive speed differential occurs therebetween. Commonly-owned U.S. Pat. No. 5,358,454 to Bowen et al. disclosed a geared traction unit suitable for such an application. An example of an electronically-controlled on-demand power transfer system is disclosed in commonly-owned U.S. Pat. No. 5,363,938 to Wilson et al. Finally, in "full-time" four-wheel drive systems, the transfer case is equipped with an interaxle differential for continuously distributing the drive torque between the front and rear output shafts while permitting speed differentiation therebetween. Commonly-owned U.S. Pat. No. 4,677,873 to Eastman et al. discloses an exemplary full-time transfer case. Many full-time transfer cases are also equipped with a "slip limiting" device for selectively or automatically limiting or preventing excessive speed differentiation across the interaxle differential as a result of excessive wheel slip. Commonly-owned U.S. Pat. Nos. 5,078,660 and 5,106,351 to Williams et al. disclose exemplary full-time transfer cases equipped with a viscous coupling for limiting slip across the interaxle differential.

The above-noted types of transfer cases are commonly designed to have one or both output shafts offset from the input shaft. In the majority of transfer cases, the rotational axis of the front output shaft is offset from the common rotational axis shared by the input shaft and the rear output shaft. This arrangement is commonly known as a single-offset transfer case. For example, FIG. 1 illustrates an exemplary power transfer system 10 for a four-wheel drive vehicle. Power transfer system 10 includes a front driveline 12 and a rear driveline 14 both of which are drivable from a source of power, such as engine 16 and transmission 18. Transmission 18 includes an output shaft 20 supported for rotation about a rotary axis "O". A transfer case 22 is provided for transmitting drive torque from transmission output shaft 20 to front driveline 12 and rear driveline 14. Specifically, an input shaft 24 of transfer case 22 is coupled to transmission output shaft 20 for rotation about a rotary axis "I" which is commonly aligned with axis "O". Front driveline 12 includes a pair of front wheels 26 connected at opposite ends of a front axle assembly 28 which is coupled by a differential 30 to one end of a front prop shaft 32, the opposite end of which is coupled to a front output shaft 34 of transfer case 22. As seen, front output shaft 34 is supported in transfer case 22 for rotation about a rotary axis "F". Rear driveline 14 includes a pair of rear wheels 36 connected at opposite ends to a rear axle assembly 38 which is coupled by a differential 40 to one end of a rear prop shaft 42, the opposite end of which is coupled to a rear output shaft 44 of transfer case. Rear output shaft 44 is supported in transfer case 22 for rotation about a rotary axis "R" which is commonly aligned with rotary axis "I" of input shaft 24. Thus, transfer case 22 is of the single-offset type.

A smaller number of transfer cases have the front and rear output shafts commonly aligned for rotation about a rotary axis that is offset from the rotary axis of the input shaft. This arrangement is commonly known as a double-offset transfer case. While single and double offset transfer cases are used in the majority of conventional four-wheel drive arrangements, the need exists to provide alternatives for use in those vehicular applications in which such conventional transfer cases are not applicable. Unfortunately, the substantial cost and leadtime required to develop an alternative transfer case for such a special vehicular application is not typically justified.

SUMMARY OF THE INVENTION

Accordingly, the present invention is directed to overcoming the conversion costs associated with utilizing a full-time, part-time or on-demand single offset transfer case in an application that requires a full-time, part-time or on-demand non-conventional, one and a half offset, transfer case by providing an adapter for connection with the existing single offset transfer case, thereby enabling the use of the existing single offset transfer case and eliminating the need to redesign and remanufacture a new transfer case for use in vehicular applications where conventional, single offset transfer cases are not applicable. More specifically, the adapter includes an input shaft adapted to be driven by the transmission output shaft about a first rotary axis and an output shaft supported for rotation about a second rotary axis. The transfer case includes an input shaft, a rear output shaft and a front output shaft. Both the input shaft and rear output shaft of the transfer case are commonly aligned with the adapter output shaft and commonly supported for rotation about the second rotary axis. The front output shaft of the transfer case is supported for rotation about a third rotary axis. In one preferred form, the transfer case is equipped with a two-speed reduction apparatus, an interaxle differential, a slip limiting device and a mode shift mechanism that are cooperatively operable for establishing full-time four-wheel high-range and low-range drive modes and a neutral non-driven mode.

According to yet another feature, the adapter assembly of the present invention is equipped with a torque disconnect clutch for permitting "on-the-fly" shifting for disconnecting the transfer of drive torque from the transmission to the transfer case.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE PREFERRED EMBODIMENTS

In general, the present invention is directed to an adapter for converting a single-offset transfer case into a one and one-half offset transfer case assembly without the need to modify the existing transfer case or to develop and manufacture a new transfer case. The following written disclosure, when taken in conjunction with the drawings and claims, is intended to describe the best mode currently known to the inventor for making the inventive concepts claimed.

Figure 1:
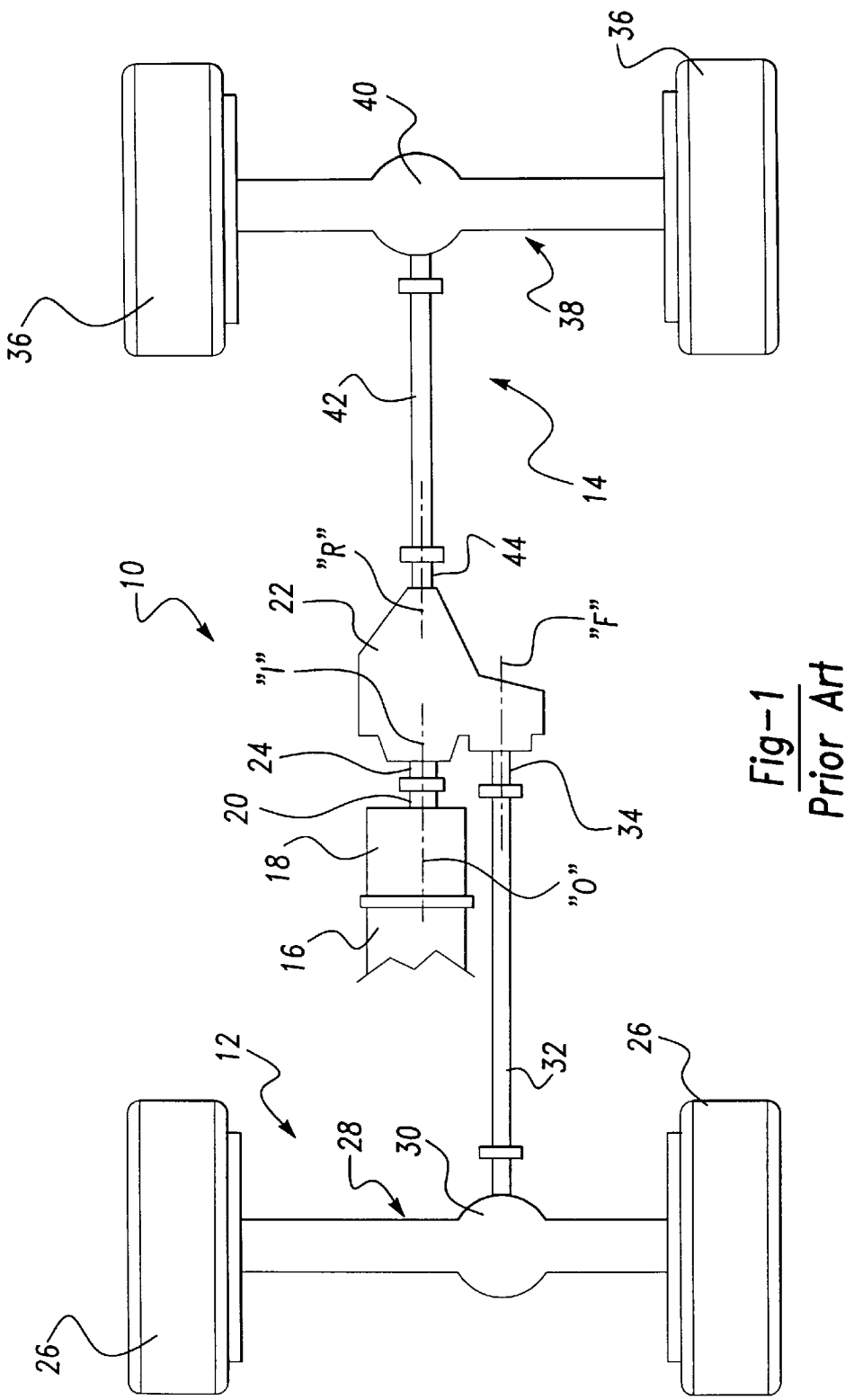
FIG. 1 is a schematic view of a power transfer system for a four-wheel drive motor vehicle utilizing a conventional single offset transfer case.
Figure 2:
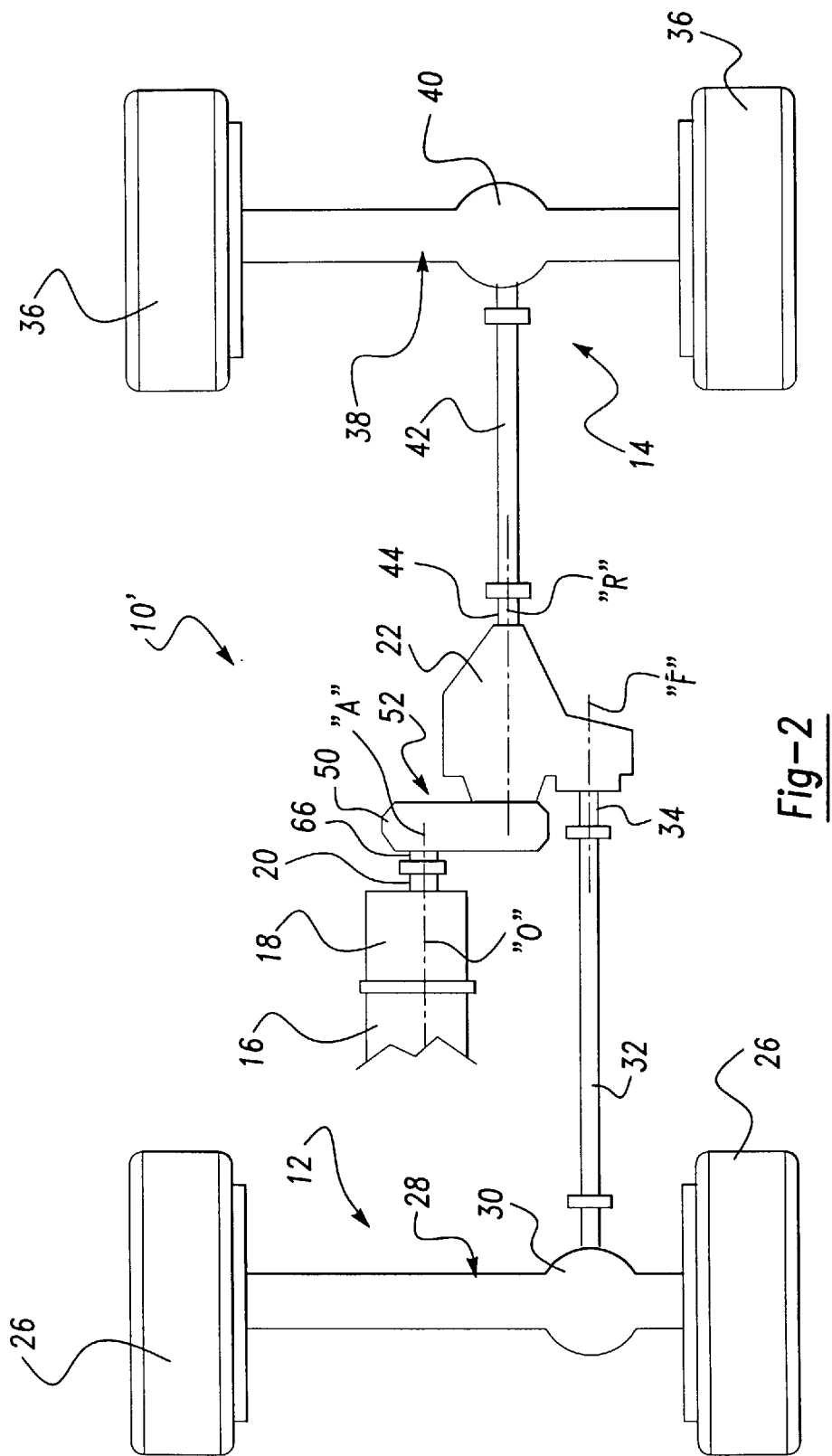
FIG. 2 is a schematic view of a power transfer system for a four-wheel drive motor vehicle according to the present invention which includes an adapter and a single-offset transfer case for providing a one and one-half offset transfer case assembly.

Referring to FIG. 2 of the drawings, a power transfer system 10' for a four-wheel drive vehicle is schematically shown to include an adapter 50 which is installed between transmission 18 and transfer case 22 to provide a one and one-half offset transfer case assembly 52. As is readily apparent, power transfer system 10' is generally similar to power transfer system 10 of FIG. 1 with the exception that adapter 50 permits a portion of the drivetrain to be laterally offset. More particularly, FIG. 2 shows engine 16 and transmission 18 to be located similar to that shown in FIG. 1, but with the front and rear driveline connections of power transfer system 10' shifted due to installation of adapter 50. Alternatively, engine 16 and transmission 18 may be offset due to adapter 50 while the front and rear driveline connections are maintained. In either case, underbody spacing and packaging alternatives are available which are not available with power transfer system 10.

Figure 3:
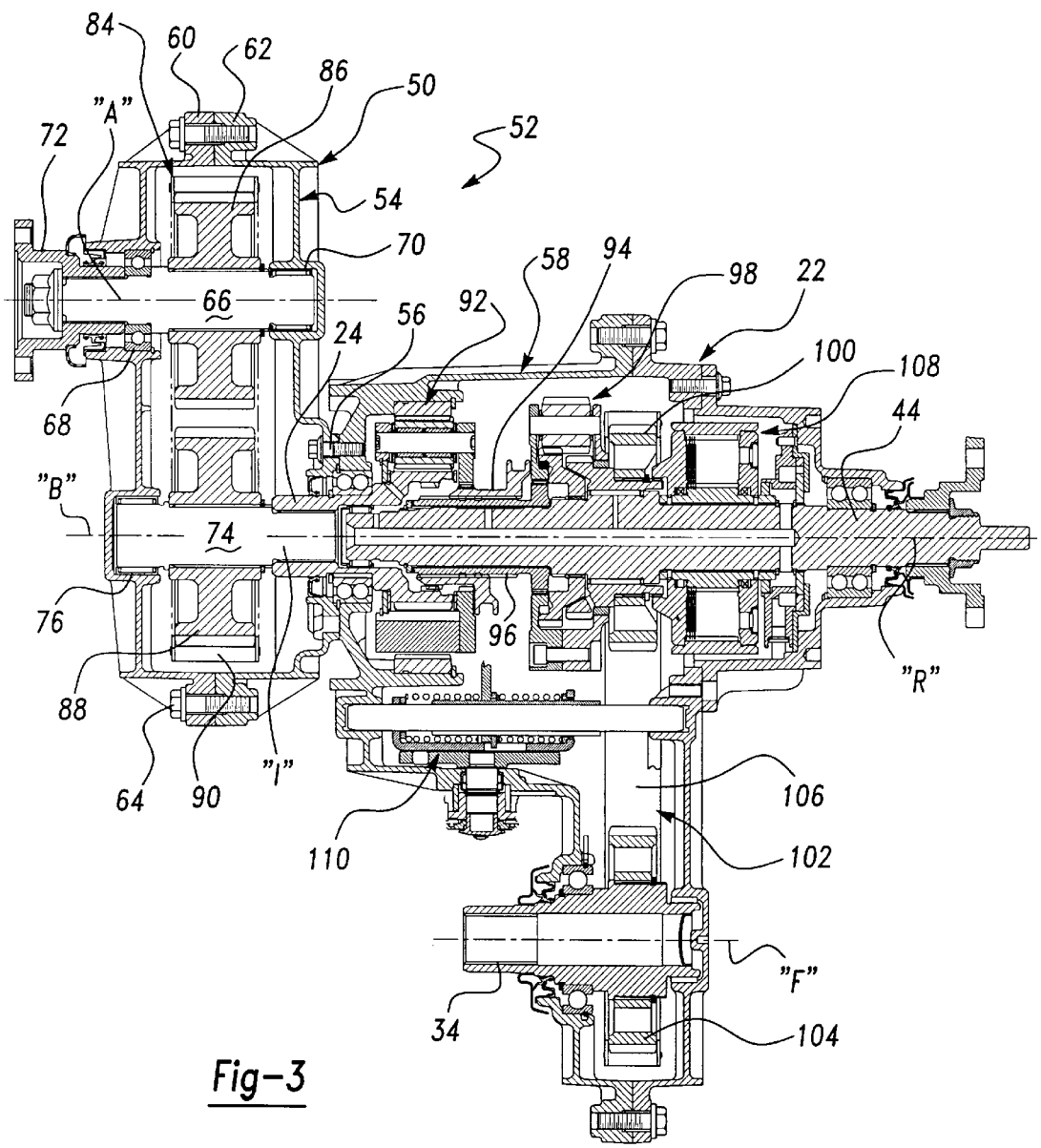
FIG. 3 is a cross-sectional view of the adapter mounted to an exemplary single-offset transfer case to define the one and one-half offset transfer case assembly.

Referring now to FIG. 3, a sectional view of transfer case assembly 52 is shown. In particular, adapter 50 is shown bolted to a conventional single-offset transfer case 22 which as shown, is a Model NV249 transfer case commercially built by New Venture Gear, Inc. of Troy, Mich. As will be appreciated, this transfer case construction is merely exemplary and it is contemplated that any single-offset transfer case can be used with adapter 50 to provide one and one-half transfer case assembly 52.

With continued reference to FIG. 3, adapter 50 is shown to include a housing 54 that is fastened by bolts 56 to a housing 58 of transfer case 22. Housing 54 includes a pair of sections 60 and 62 secured together by fasteners, such as bolts 64. An adapter input shaft 66 is supported from housing 54 by bearing assemblies 68 and 70 for rotation about a rotary axis "A". Adapter input shaft 66 is adapted to be coupled to transmission output shaft 20 such that rotary axis "A" is commonly aligned with rotary axis "O". A yoke 72 is shown fixed to adapter input shaft 66 for facilitating attachment to transmission output shaft 20 in a known manner. In addition, an adapter output shaft 74 is supported from housing 54 for rotation about a rotary axis "B". One end of adapter output shaft 74 is supported in housing 54 by bearing assembly 76, while the opposite end of adapter output shaft 74 is adapted to be coupled (i.e., splined) for rotation with input shaft 24 of transfer case 22 such that its rotary axis "B" is commonly aligned with rotary axis "I" of input shaft 24.

To transfer drive torque from adapter input shaft 66 to adapter output shaft 74, a drive mechanism 84 is provided. Drive mechanism 84 includes a drive sprocket 86 fixed (i.e., splined) to adapter input shaft 66, a driven sprocket 88 fixed (i.e., splined) to adapter output shaft 74, and a continuous drive chain 90 interconnected therebetween. As an alternative, drive sprocket 86 and driven sprocket 88 could be geared components that are meshed directly together.

Transfer case 22 is shown to include a planetary speed reduction gear assembly 92 driven by input shaft 24, and a range clutch 94 splined for both rotation with and axial sliding movement on a quill shaft 96 which is fixed (i.e., splined) to rear output shaft 44. Range clutch 94 can be slid between three distinct positions for establishing three different modes of operation. Specifically, range clutch 94 can selectively engage input shaft 24 for driving quill shaft 96 at a direct (i.e., high-range) speed ratio. Also, range clutch 94 can selectively engage speed reduction unit 92 for driving quill shaft 96 at a reduced (i.e., low-range) speed ratio. Finally, range clutch 94 can be released from engagement with either of input shaft 24 and speed reduction unit 92 for disconnecting quill shaft 96 from input shaft 24.

Quill shaft 96 is shown driving the input of a planetary-type interaxle differential 98, the outputs of which are connected to rear output shaft 44 and a drive sprocket 100. Drive sprocket 100 is associated with a front drive arrangement 102 which is operable for driving front output shaft 34 from drive sprocket 100. Drive arrangement 102 also includes a driven sprocket 104 fixed to front output shaft 34 and a continuous drive chain 106 meshed with drive sprocket 100 and driven sprocket 104. Thus, interaxle differential 98 is operable to permit speed differentiation and distribute torque between rear output shaft 44 and front output shaft 34. A slip limiting device, such as a viscous coupling 108 is operably connected between front output shaft 34 and rear output shaft 44 to progressively limit or inhibit excessive speed differences therebetween due to interaxle slip. Finally, a shift mechanism 110 is provided which, under the control of the vehicle operator, permits transfer case 22 to be selectively shifted between its high-range, low-range and neutral modes. Thus, transfer case 22 is a two-speed full-time limited-slip single-offset transfer case.

Housing 54 of adapter 50 is shown to be secured to housing 58 of transfer case 22 by fasteners, such as bolts 56. Preferably, the bolt pattern in housing 54 corresponds to a standardized bolt pattern used for transmission 18 since adapter 50 is bolted to transfer case 22 in place of transmission 18. An advantageous feature of adapter 50 is that the angle between output shaft 20 of transmission 18 and input shaft 24 of transfer case 22 can be modified as desired by selectively rotating housing 54 of adapter 50 about axis "B". Achieving this benefit of selective angulation may require a change in the bolt pattern used for securing adapter 50 to transfer case 22.

Figure 4:
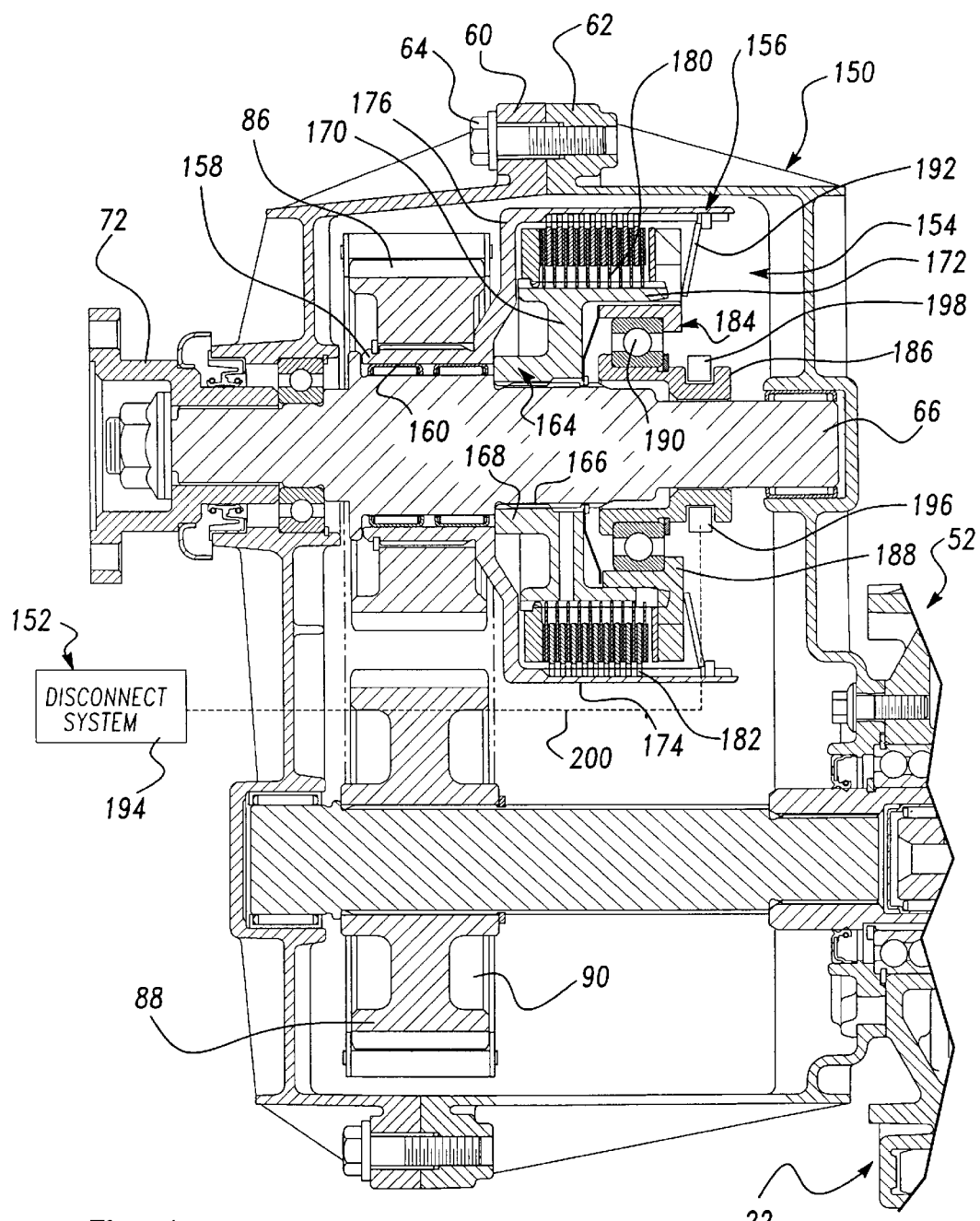
FIG. 4 is a partial cross-sectional view of an alternative construction for the adapter of the present invention.

FIG. 4 illustrates a portion of an alternative adapter, identified by reference numeral 150, which is operable in conjunction with a disconnect system 152 to permit the vehicle operator to disconnect the transfer of drive torque from transmission 18 to transfer case 22 via actuation of a lock-up clutch 154. Situations in which interruption of drive torque to transfer case 22 is desired include during towing of the vehicle or to assist in "on-the-fly" shifting between the four-wheel high-range and low-range drive modes. As seen, those components of adapter 150 that are identical or substantially similar to those previously disclosed in association with adapter 50 are identified by common reference numerals.

Lock-up clutch 154 includes an outer drum 156 which has an axial hub portion 158 rotatably supported by bearings 160 on adapter input shaft 66 and to which drive sprocket 86 is fixed via splined connection 162. Drive sprocket 86 of adapter 150 drivingly engages chain 90, which, in turn, is coupled to driven sprocket 88. Clutch 154 also includes an inner drum 164 that is fixed via a splined connection 166 to adapter input shaft 66 for rotation therewith. Outer drum 156 is arranged to concentrically surround inner drum 164 so as to form an internal chamber therebetween. Thus, outer drum 156 and inner drum 164 are capable of rotating relative to one another. Inner drum 164 is shown as having an annular hub portion 168 splined to adapter input shaft 66, a web portion 70 extending radially from annular hub portion 168, and a cylindrical drum portion 172 formed at the opposite end of web portion 170 which and extends coaxially to hub portion 168. Outer drum 156 has a cylindrical drum portion 174 which is enclosed at one end by an end plate 176. As seen, end plate 176 interconnects drum 174 to hub 158.

Disposed within the internal chamber are two sets of alternately interleaved friction clutch plates defining a clutch pack. One set of clutch plates, referred to as inner clutch plates 180, are mounted (i.e., splined) to an outer peripheral surface of cylindrical drum portion 172 of inner drum 164 for driven rotation with adapter input shaft 66. The second set of clutch plates, referred to as outer clutch plates 182, are mounted (i.e., splined) to an inner peripheral surface of cylindrical drum portion 174 of outer drum 156 for rotation with drive sprocket 86. In operation, the interleaved clutch plates can be frictionally compressed so as to normally cause drive torque to be transferred from adapter input shaft 66 and inner drum 164 to outer drum 156 and drive sprocket 86 in response to a clutch engagement force applied to the clutch plates. This clutch engagement force is exerted on the clutch pack by a thrust mechanism 184 comprised of a sleeve 186 journally supported on adapter input shaft 66, an apply plate 188 coupled for rotation with inner drum 164, and a thrust bearing 190 retained therebetween. Apply plate 188 is engageable with the clutch pack to apply the clutch engagement force thereon. A power spring 192 acts on apply plate 188 to normally urge it and thrust mechanism 184 to a position engaging the clutch pack and transferring drive torque through lock-up clutch 154 to adapter input shaft 66, thereby establishing the locked mode of clutch 154. To provide means for shifting lock-up clutch 154 from its locked mode into a released mode, disconnect system 152 is shown schematically to include an operator 194 which is coupled to a shift fork 196 retained in a groove 198 formed in sleeve 186. The coupling is schematically shown by lead-line 200. Operator 194 can be selectively actuated by the vehicle operator for moving sleeve 186 from the position shown to a second position, in opposition to the biasing of power spring 192, for moving thrust mechanism 184 and apply plate 188 to a position whereat the clutch engagement force exerted on the interleaved clutch pack permits outer drum 156 to rotate relative to inner drum 164 without any significant torque transferred therebetween. In this manner, drive sprocket 86 is disconnected from adapter input shaft 66 such that adapter 150 does not transfer torque to transfer case 22 when lock-up clutch 154 is in its released mode. Operator 194 can be a manually-operated handle and coupling 200 can be a linkage connected to shift fork 196. Alternatively, disconnect system 152 can be electronically-controlled to provide torque transfer control either under a on/off control scheme or a progressive control scheme capable of modulating the torque transferred as a function of one or more measured vehicle parameters (i.e., engine speed, vehicle speed, etc.). In such a scenario, operator 194 would include a power-driven motor connected to shift fork 196 or directly to sleeve 186. Disconnect system 152 would include a switch which, under the control of the vehicle operator, select the mode of lock-up clutch 154 and/or the desired control scheme.

While specific embodiments of an adapter have been shown in conjunction with a full-time single offset transfer case which, as noted, is similar to the NV249 transfer case manufactured by New Venture Gear, Inc., it will be understood that the adapters of the present invention may likewise be readily incorporated into any transfer case assembly when the transfer case has a first output commonly aligned on an axis with the output of the transmission and a second output offset therefrom. For example, adapters 50 and 150 can be installed on any single-offset transfer case currently available, which is built during the life of the patent, or which is disclosed in patents. In addition, transfer case 22 can be of the full-time, part-time or on-demand variety.

Further, it will be appreciated by those skilled in the art that the present invention may be embodied in other forms without departing from the principals and the fair scope of the present invention. Various other advantages and modifications will become apparent to one skilled in the art after having the benefit of studying the teachings of the specification, the drawings and the following claims.

What is claimed is:

1. A transfer case assembly adapted for connecting a transmission output shaft to front and rear drivelines of a motor vehicle, said transfer case assembly comprising:

an adapter having a housing, an adapter input shaft supported from said housing for rotation about a first rotary axis and adapted for connection to the transmission output shaft, an adapter output shaft supported from said housing for rotation about a second rotary axis which is offset from said first rotary axis, and a drive mechanism coupling said adapter output shaft to said adapter input shaft; and a transfer case having a housing, an input shaft supported from said housing and coupled to said adapter output shaft for rotation about said second rotary axis, a rear output shaft supported from said housing for rotation about said second rotary axis and which is adapted for connection to the rear driveline, and a front output shaft supported from said housing for rotation about a third rotary axis which is offset from said first and second rotary axes, said front output shaft is adapted for connection to the front driveline.

2. The transfer case assembly of claim 1 wherein said housing of said adapter is secured to said housing of said transfer case.

3. The transfer case assembly of claim 1 wherein said drive mechanism includes a drive sprocket fixed to said adapter input shaft, a driven sprocket fixed to said adapter output shaft, and a drive chain interconnecting said drive sprocket to said driven sprocket.

4. The transfer case assembly of claim 1 wherein said transfer case is a single-offset transfer case including means for selectively connecting said input shaft to said rear output shaft.

5. The transfer case assembly of claim 1 wherein said transfer case includes a mechanism for transferring drive torque from said rear output shaft to said front output shaft.

6. The transfer case assembly of claim 1 wherein said drive mechanism includes a drive sprocket rotatably supported on said adapter input shaft, a driven sprocket fixed to said adapter output shaft, a drive chain connecting said drive sprocket to said driven sprocket, and a lock-up clutch operable for releasably coupling said drive sprocket to said adapter input shaft.

7. An adapter for use with a transmission having a transmission output and a transfer case having a housing a first output shaft and a second output shaft, said first output shaft offset from said second output shaft and said housing supporting said first and second output shafts, said adapter comprising:

an adapter housing, an adapter input shaft adapted to be rotatably driven by the transmission output about a first rotary axis and supported by said adapter housing;

an adapter output shaft adapted to rotatably drive the transfer case first output shaft about a second rotary axis and supported by said adapter housing; and a drive mechanism interconnecting said adapter input shaft to said adapter output shaft.

8. The adapter of claim 7 wherein said drive mechanism includes a drive sprocket fixed to said adapter input shaft, a driven sprocket fixed to said output shaft, and a drive chain interconnecting said drive sprocket to said driven sprocket.

9. The adapter of claim 8 wherein said adapter output shaft is commonly aligned with the first output of the transfer case for common rotation therewith about said second rotary axis.

10. The adapter of claim 8 wherein said adapter output shaft is offset from the second output shaft of the transfer case, with the second output of the transfer case being adapted for rotation about a third rotary axis.

* * * * *

UNITED STATES PATENT AND TRADEMARK OFFICE
CERTIFICATE OF CORRECTION

PATENT NO. : 5,967,930
DATED : October 19, 1999
INVENTOR(S) : Parvinder Ahluwalia It is certified that error appears in the above-identified patent and that said Letters Patent is hereby corrected as shown below:

Column 8, line 21, claim 10, after "second output" insert --shaft--.

Signed and Sealed this

Fifth Day of December, 2000

Attest:

Attesting Officer

Q. TODD DICKINSON
Director of Patents and Trademarks